(12) United States Patent
Ang et al.

(10) Patent No.: US 11,382,118 B2
(45) Date of Patent: Jul. 5, 2022

(54) MINIMUM SCHEDULING DELAY SIGNALING

(71) Applicant: QUALCOMM Incorporated, San Diego, CA (US)

(72) Inventors: Peter Pui Lok Ang, San Diego, CA (US); Joseph Binamira Soriaga, San Diego, CA (US); Huilin Xu, San Diego, CA (US); Heechoon Lee, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/584,833

(22) Filed: Sep. 26, 2019

(65) Prior Publication Data

US 2020/0107345 A1    Apr. 2, 2020

Related U.S. Application Data

(60) Provisional application No. 62/847,045, filed on May 31, 2019, provisional application No. 62/828,220, (Continued)

(51) Int. Cl.
| | | |
|---|---|---|
| H04L 12/28 | (2006.01) | |
| H04W 72/12 | (2009.01) | |
| H04W 72/04 | (2009.01) | |
| H04W 80/02 | (2009.01) | |
| H04L 5/00 | (2006.01) | |
| H04L 25/02 | (2006.01) | |
| H04L 1/00 | (2006.01) | |

(Continued)

(52) U.S. Cl.
CPC ....... *H04W 72/1273* (2013.01); *H04L 1/0026* (2013.01); *H04L 5/001* (2013.01); *H04L 5/0051* (2013.01); *H04L 5/0092* (2013.01); *H04L 25/0226* (2013.01); *H04W 72/042* (2013.01); *H04W 72/1257* (2013.01); *H04W 76/27* (2018.02); *H04W 80/02* (2013.01)

(58) Field of Classification Search
CPC ... H04W 24/00; H04W 28/26; H04W 72/042; H04L 5/0078
USPC .................................. 370/252, 468
See application file for complete search history.

(56) References Cited

U.S. PATENT DOCUMENTS

| | | | | |
|---|---|---|---|---|
| 2012/0269143 | A1* | 10/2012 | Bertrand | H04W 72/1231 370/329 |
| 2013/0322349 | A1* | 12/2013 | Hosangadi | H04L 1/0025 370/329 |

(Continued)

FOREIGN PATENT DOCUMENTS

| | | |
|---|---|---|
| CN | 108076455 A | 5/2018 |
| WO | 2017213421 A1 | 12/2017 |
| WO | 2018175805 A1 | 9/2018 |

OTHER PUBLICATIONS

Liu et al., "A method and device for resource scheduling", Jul. 5, 2018, Huawei Tech. Co., 201810731379.1 Translation.*

(Continued)

*Primary Examiner* — John Pezzlo
(74) *Attorney, Agent, or Firm* — Patterson + Sheridan, L.L.P.

(57) ABSTRACT

Certain aspects of the present disclosure generally relate to methods and apparatus for minimum scheduling delay signaling.

32 Claims, 13 Drawing Sheets

Related U.S. Application Data filed on Apr. 2, 2019, provisional application No. 62/791,445, filed on Jan. 11, 2019, provisional application No. 62/739,084, filed on Sep. 28, 2018.

(51) Int. Cl.
 *H04W 76/27* (2018.01)
 *H04J 1/16* (2006.01)

(56) References Cited

U.S. PATENT DOCUMENTS

| | | | |
|---|---|---|---|
| 2018/0049215 A1 | 2/2018 | Gheorghiu et al. | |
| 2018/0302834 A1 | 10/2018 | Zhang et al. | |
| 2019/0215888 A1* | 7/2019 | Cirik | H04W 72/042 |
| 2019/0261405 A1 | 8/2019 | Ang et al. | |
| 2019/0342864 A1 | 11/2019 | Hwang et al. | |
| 2020/0196337 A1 | 6/2020 | Ang et al. | |
| 2020/0245343 A1* | 7/2020 | Kim | H02J 50/10 |
| 2021/0127389 A1* | 4/2021 | Liu | H04W 88/14 |
| 2021/0321446 A1* | 10/2021 | Lee | H04W 72/1257 |

OTHER PUBLICATIONS

International Search Report and Written Opinion—PCT/US2019/053374—ISAEPO—dated Dec. 12, 2019.

\* cited by examiner

Single BWP:

A-CSI triggering:

MINIMUM SCHEDULING DELAY SIGNALING

CROSS-REFERENCE TO RELATED APPLICATIONS

This Patent Application claims priority to U.S. Provisional Patent Applications No. 62/739,084 filed Sep. 28, 2018, No. 62/791,445 filed Jan. 11, 2019, 62/828,220 filed Apr. 2, 2019, and 62/847,045 filed May 13, 2019, each of which is assigned to the assignee hereof, is considered part of, and is incorporated by reference in this Patent Applications.

BACKGROUND

Field of the Disclosure

Aspects of the present disclosure relate generally to wireless communications systems, and more particularly, to signaling scheduling delays.

DESCRIPTION OF RELATED ART

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for signaling scheduling information.

Certain aspects of the present disclosure provide a method for wireless communication by a user equipment (UE). The method generally includes receiving a physical downlink control channel (PDCCH) with downlink control information (DCI) signaling a scheduling parameter indicating a scheduling delay between an end of the PDCCH transmission and a beginning of a transmission scheduled by the PDCCH, determining a value of the scheduling parameter is below a minimum threshold, and taking at least one action in response to the determination.

Certain aspects of the present disclosure provide a method for wireless communication by a network entity. The method generally includes determining a minimum threshold for a scheduling parameter that indicates a scheduling delay between an end of a physical downlink control channel (PDCCH) transmission and a beginning of a transmission scheduled by the PDCCH and configuring a user equipment (UE) with the minimum threshold.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
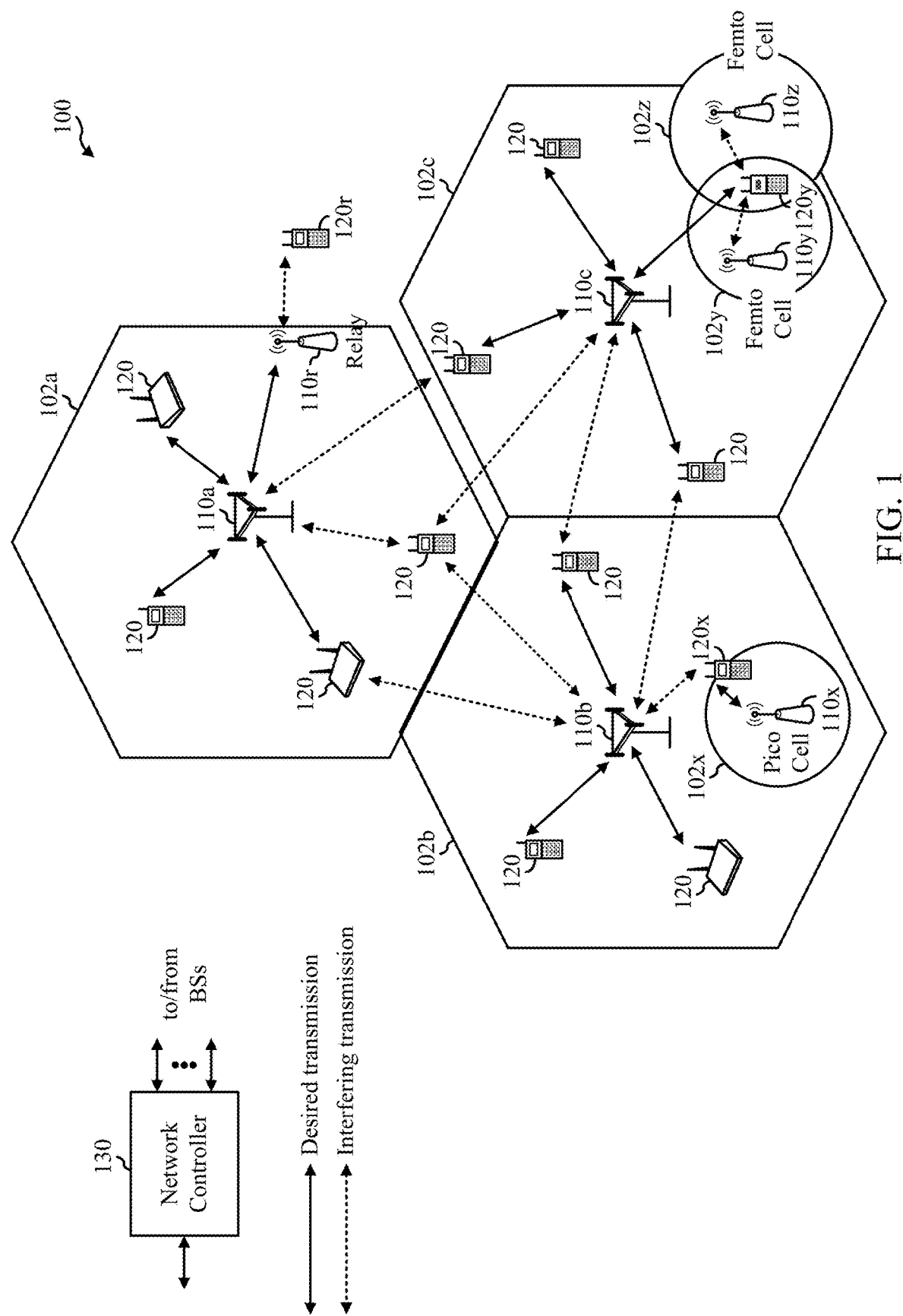
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may include a network entity (e.g., a gNB 110) configured to perform operations 1000 of FIG. 10 to signal minimum scheduling delays to a UE 120 (configured to perform operations 1100 of FIG. 11

A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
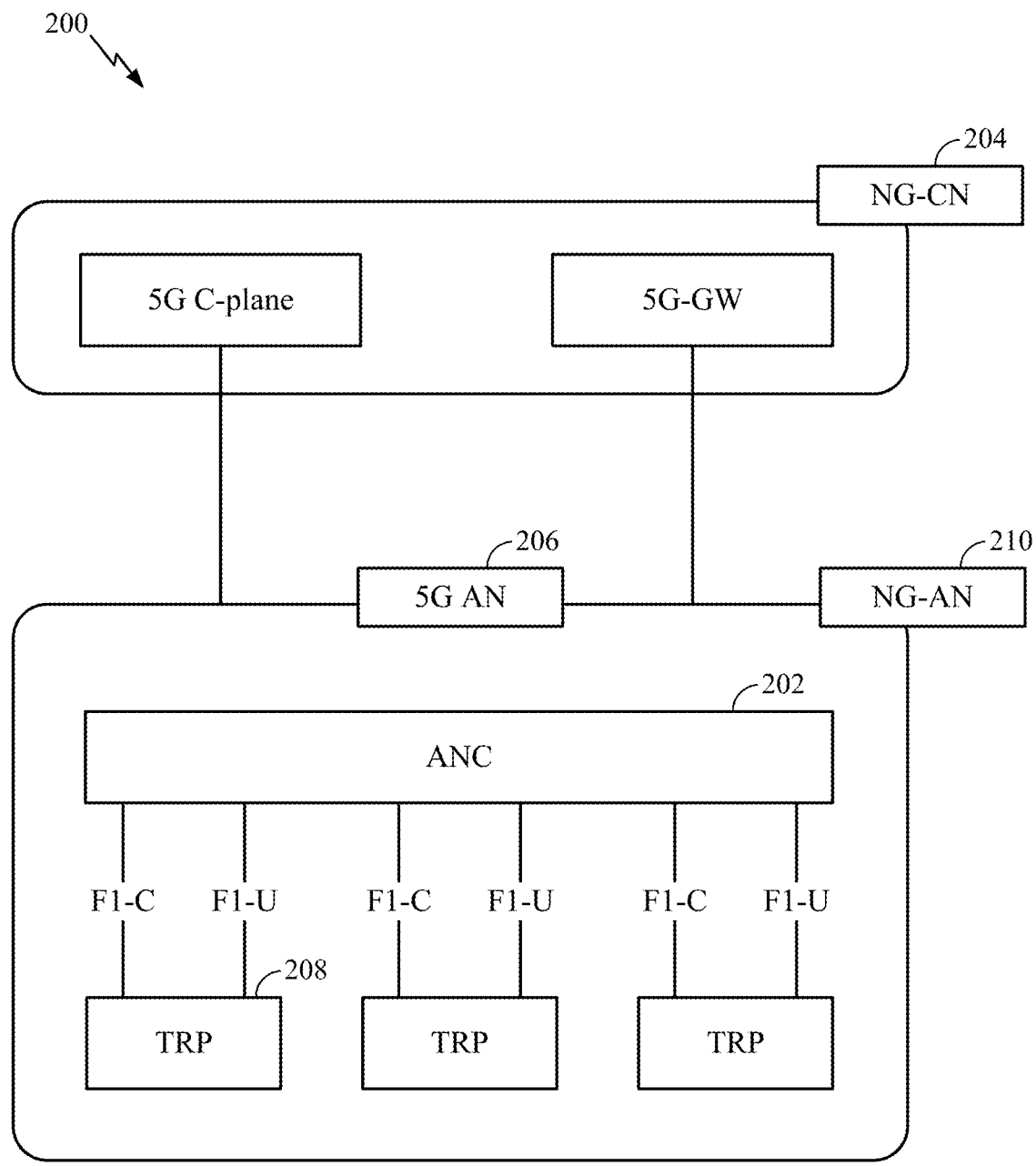
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
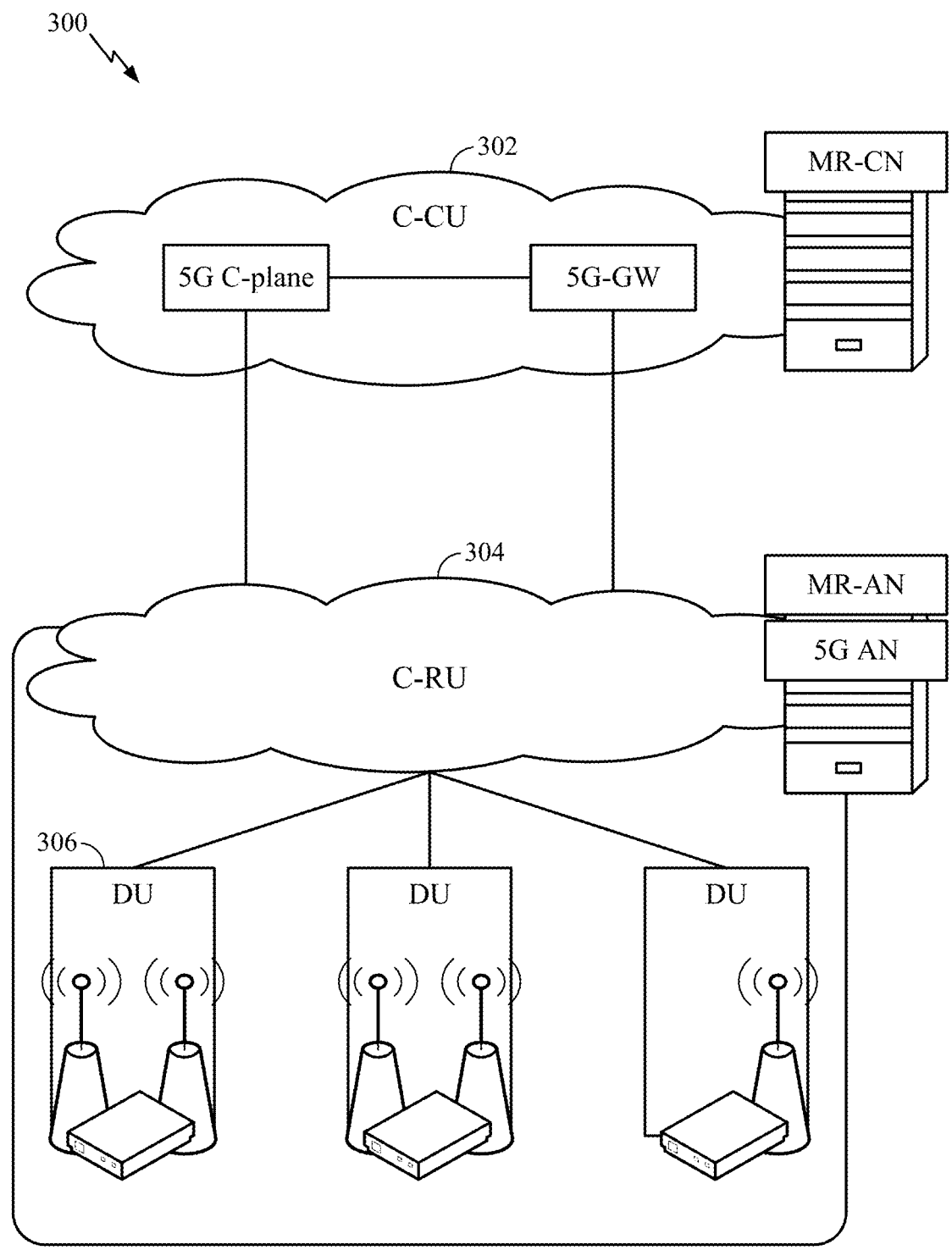
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
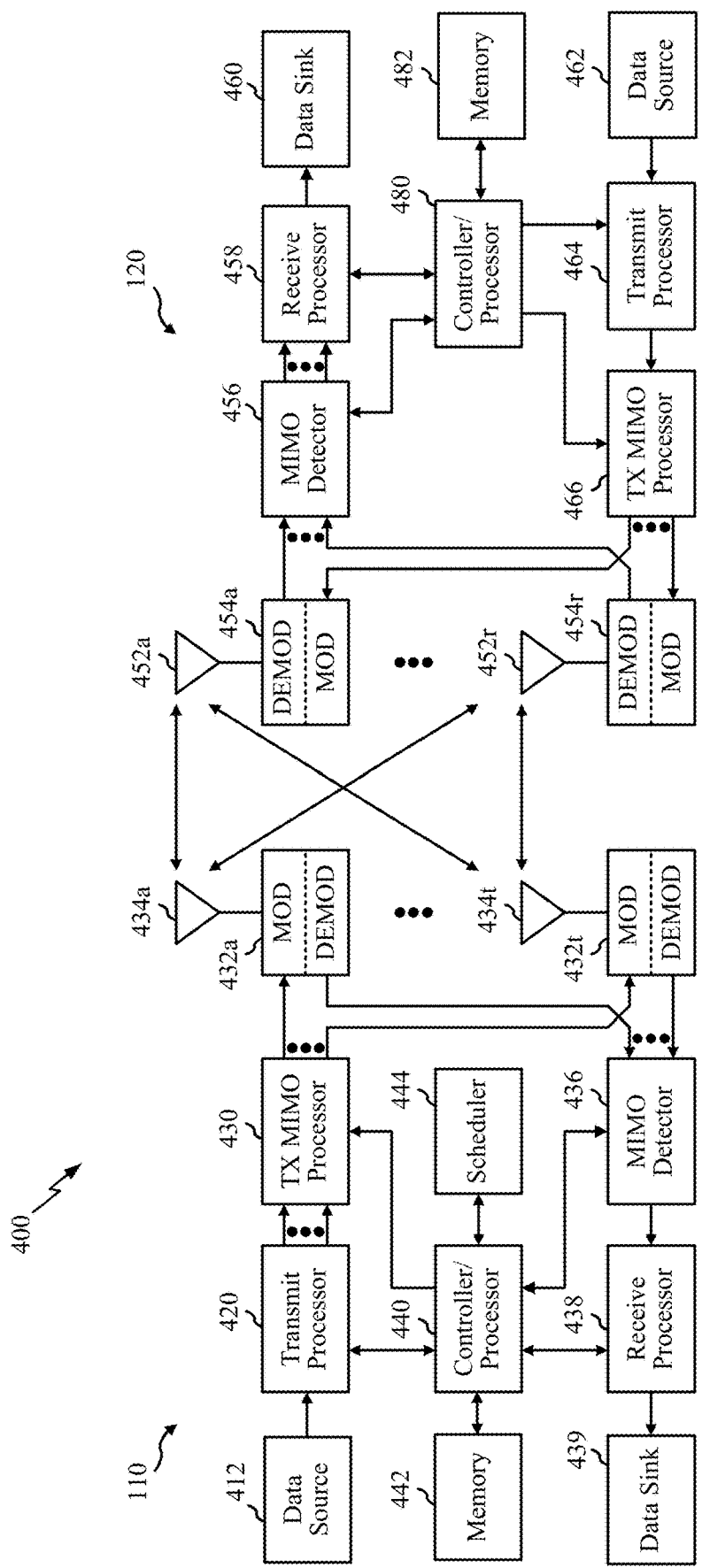
FIG. 4 is a block diagram conceptually illustrating a design of an example base station (BS) and user equipment (UE), in accordance with certain aspects of the present disclosure.

FIG. 4 illustrates example components 400 of the gNB 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 may be configured to perform operations 1100 of FIG. 11, and/or antennas 434, processors 460, 420, 438, and/or controller/processor 440 of the gNB 110 may be configured to perform operations 1100 of FIG. 10.

FIG. 4 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 434a through 434t, and the UE 120 may be equipped with antennas 452a through 452r.

At the gNB 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the gNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the gNB 110. At the gNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the gNB 110 and the UE 120, respectively. The processor 440 and/or other processors and modules at the gNB 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the gNB 110 may also perform or direct, e.g., the execution of the functional blocks illustrated in FIG. 10, and/or other processes for the techniques described herein. The memories 442, 482 may store data and program codes for the gNB 110 and the UE 120, respectively. A scheduler 444 may schedule UEs for data transmission on the downlink and/or uplink.

Figure 5:
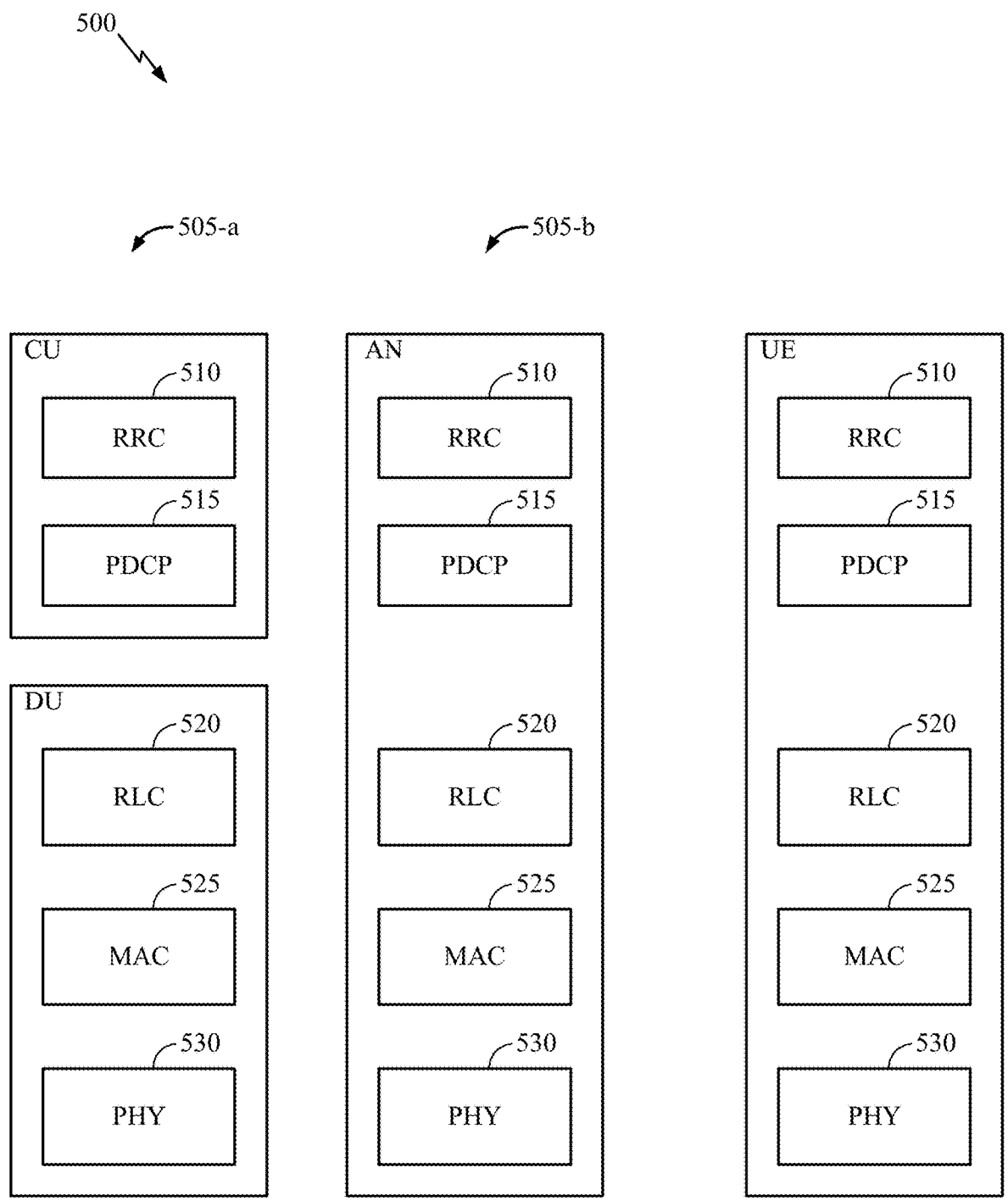
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR B S), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
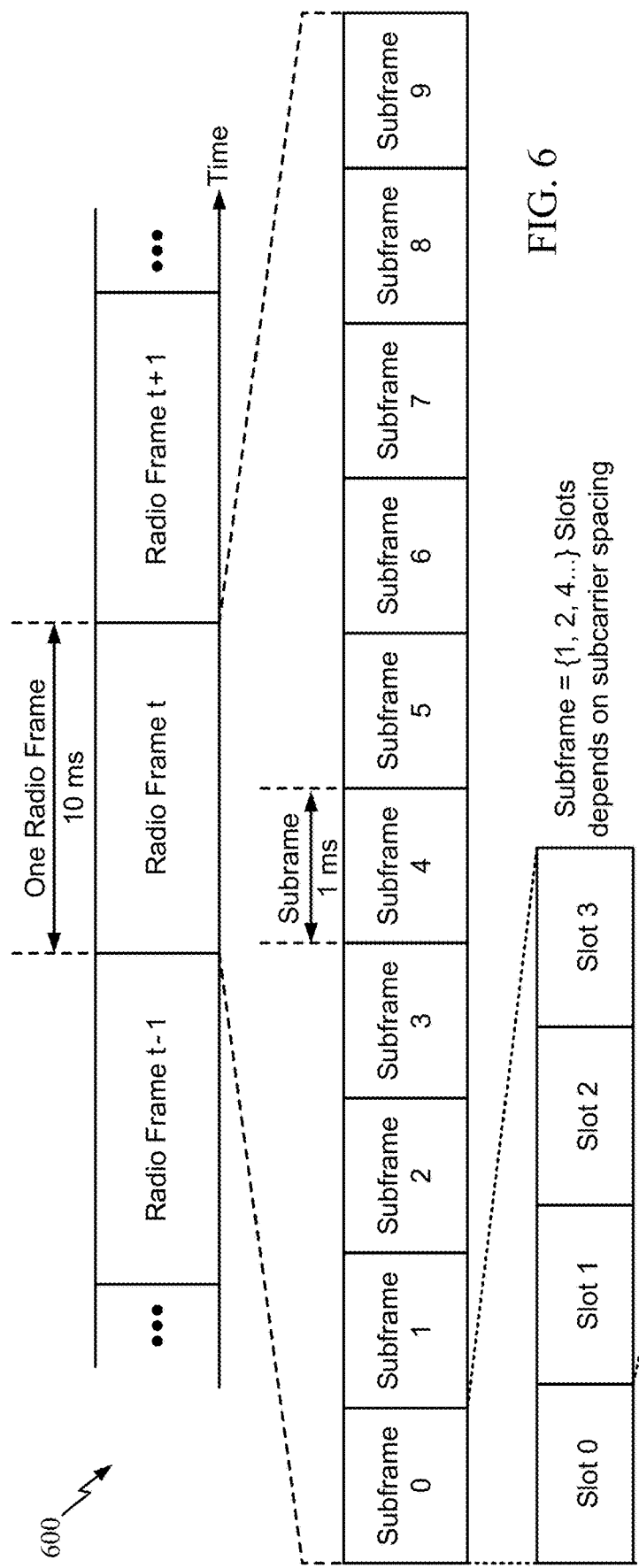
FIGS. 6 and 7 illustrate an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 7:
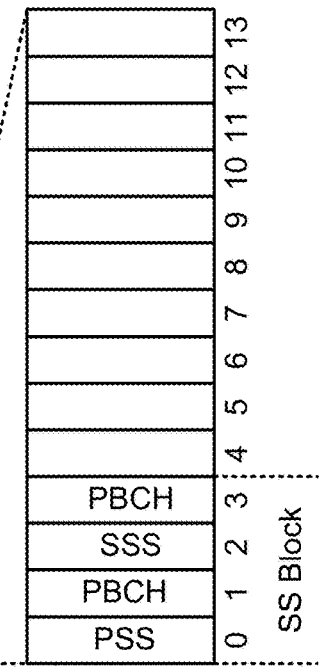

In NR, a synchronization signal (SS) block is transmitted. As illustrated in FIG. 7, the SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or gNB), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Aspects of the present disclosure provide apparatus, methods, processing systems, and computer program products for new radio (NR) (new radio access technology or 5G technology). New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service. The RAN may include a central unit (CU) and distributed units (DUs). A NR Node B (e.g., 5G Node B) may correspond to one or multiple transmission reception points (TRPs).

Example Techniques for Minimum Scheduling Delay Signaling

Bandwidth part (BWP) for NR provides a means of operating UEs with smaller bandwidth, as compared with a wider system bandwidth configuration. This use of BWPs help make NR an energy efficient solution despite the support of wideband operation.

Switching between cross-slot scheduling (e.g., DCI in one slot schedules an event in another slot) for power saving and same-slot scheduling (e.g., DCI in one slot schedules an event in the same slot) may be supported with BWP adaptation, but may be cumbersome. Moreover, cross-slot scheduling for power saving may not work if non-Type-D-quasi co location (QCL) aperiodic-channel state information (CSI) request is supported.

Figure 8:
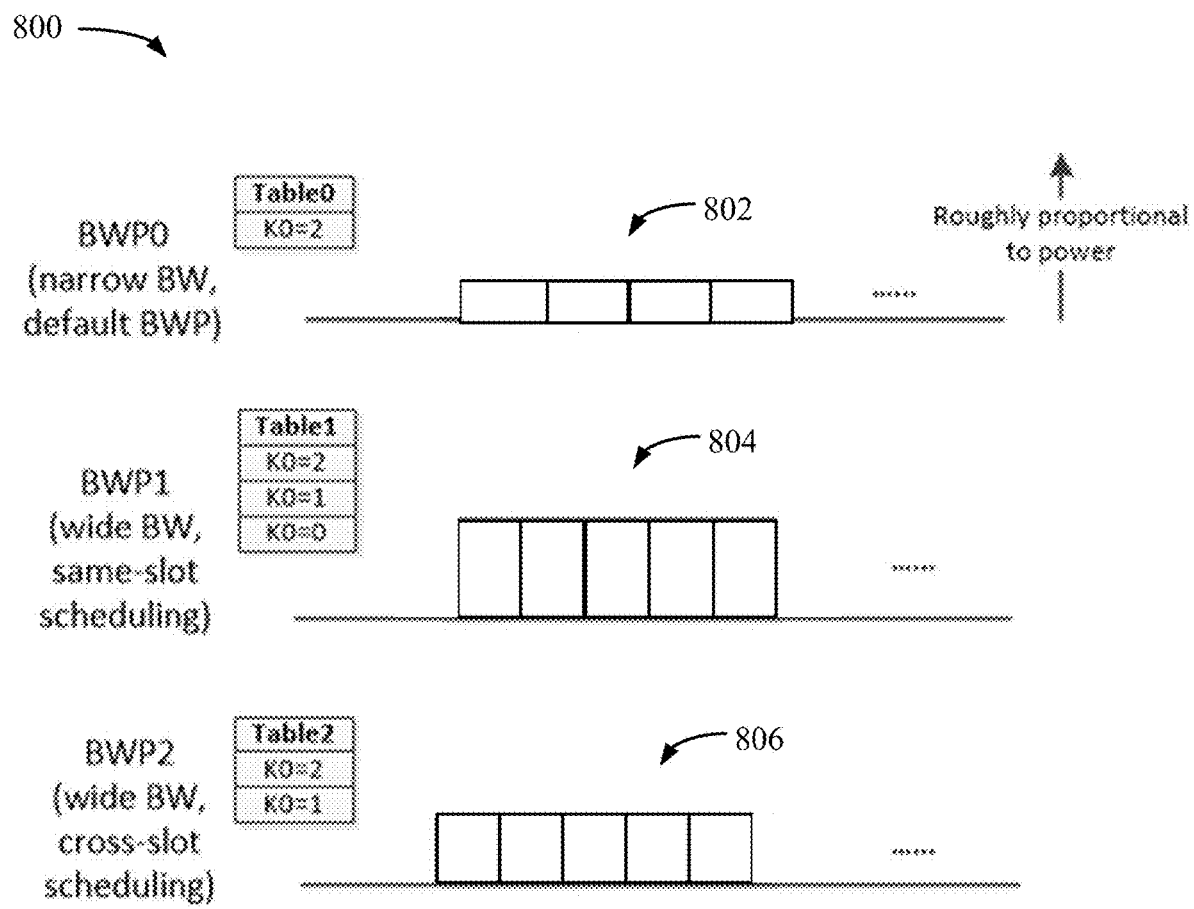
FIG. 8 illustrates example downlink communications with bandwidth parts (BWP).

FIG. 8 illustrates example downlink communications for BWP. For example, slots 802 for BWP0 may be narrow band (e.g., default BWP), slots 804 for BWP1 may be wide band and may employ same slot scheduling, and slots 806 for BWP2 may be wide band with cross-slot scheduling. Different BWPs may correspond to different power consumptions. Therefore, power may be saved by switching between BWPs, for example, from a BWP with a higher corresponding power consumption to a BWP with a lower power consumption.

Figure 9:
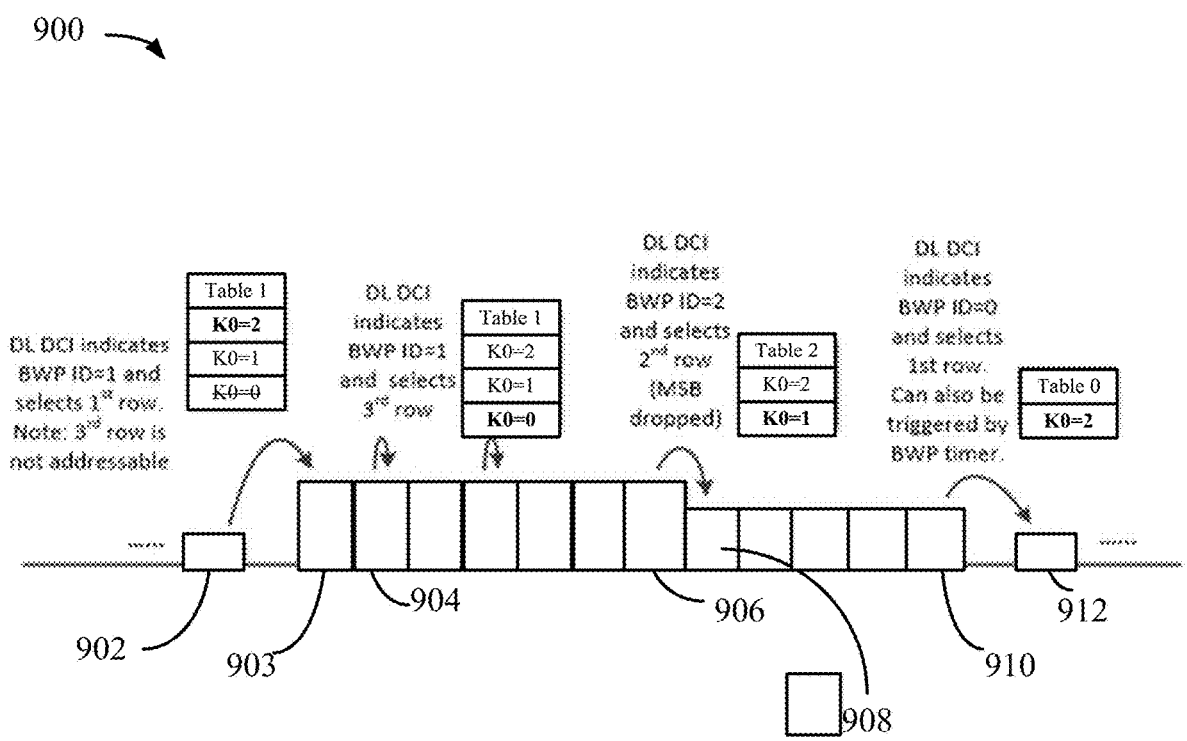
FIG. 9 illustrates an example downlink communications with multiple BWPs having downlink control information (DCI).

FIG. 9 illustrates an example downlink communications with multiple BWPs having DCI. As illustrated, the DCI in BWP0 of slot 902 may indicate a BWP ID of 1 (e.g., indicating BWP1) and select a first row (k0=2) of a table (table 1) for k0 to schedule data in slot 903.

The parameter k0 generally indicates a delay between DL grant and corresponding DL data (PDSCH) reception. As illustrated, the third row of table 1 may not be addressable. In slot 904, a DCI may indicate BWP ID of 1 and select the third row (k0=0) to schedule downlink data in the same slot 904. In slot 906, the DCI may indicate a BWP ID of 2 (e.g., indicating BWP2) and select the second row of another table (table 2), indicating a k0 of 1 to schedule data in slot 908. Moreover, in slot 910, the DCI may indicate BWP ID of 1, and select the first row of another table (Table 0), indicating k0=2, in order to schedule data in slot 912. Certain aspects of the present disclosure provide enhancement to improve cross-slot scheduling configuration by implementing a minimum k0 threshold which may be dynamically updated or explicitly configured. For example, a UE may either invalidate DCI based on an indicated k0 or adjust the indicated k0, according to the minimum k0 threshold. Aspects described herein may also be beneficial to carrier aggregation (CA) power for cross-carrier scheduling. Similar techniques may also be applied for the parameter k2, used to indicate a delay between UL grant reception in DL and UL data (PUSCH) transmission.

Figure 10:
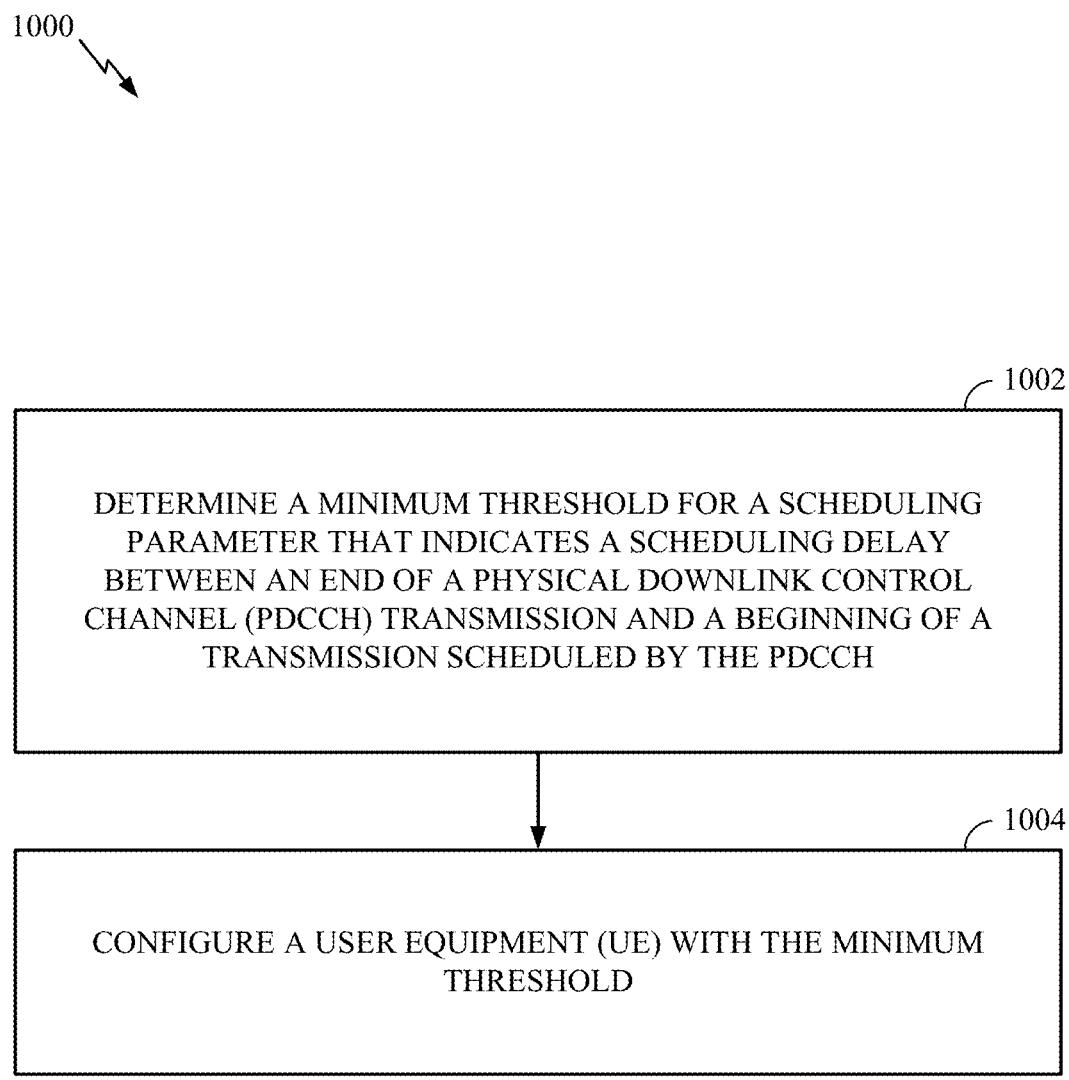
FIG. 10 illustrates example operations for wireless communication by a base station, in accordance with certain aspects of the present disclosure.

FIG. 10 illustrates example operations 1000 for wireless communication, in accordance with certain aspects of the present disclosure. The operations 1000 may be performed, for example, by a base station, such as the base station 110.

The operations 1000 begin, at block 1002, by determining a minimum threshold for a scheduling parameter that indicates a scheduling delay between an end of a physical downlink control channel (PDCCH) transmission and a beginning of a transmission scheduled by the PDCCH. At 1004, the base station configures a user equipment (UE) with the minimum threshold.

In some cases, rather than a base station configuring the UE with the minimum threshold, the minimum threshold may be specified in a standard.

Figure 11:
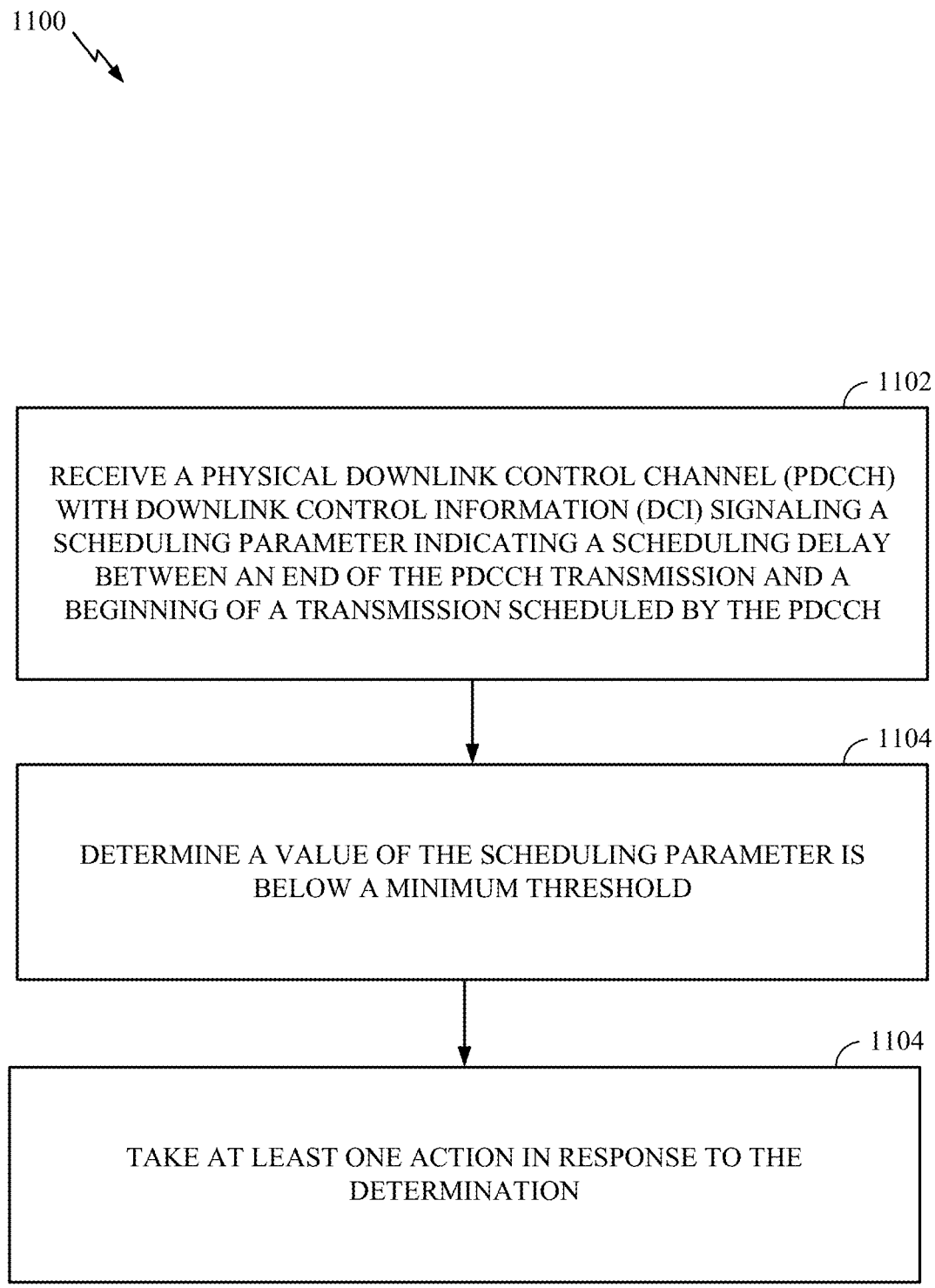
FIG. 11 illustrates example operations for wireless communication by a user-equipment (UE), in accordance with certain aspects of the present disclosure.

FIG. 11 illustrates example operations 1100 for wireless communication, in accordance with certain aspects of the present disclosure. The operations 1100 may be performed, for example, by a UE, such as the UE 120. The operations 1100 correspond to the operations 1000, but from the perspective of the UE 120.

The operations 1100 begin, at block 1102, by receiving a physical downlink control channel (PDCCH) with downlink control information (DCI) signaling a scheduling parameter indicating a scheduling delay between an end of the PDCCH transmission and a beginning of a transmission scheduled by the PDCCH. At 1104, the UE determines a value of the scheduling parameter is below a minimum threshold. At 1106, the UE taking at least one action in response to the determination.

In certain aspects, the minimum k0 threshold may be semi-statically signaled per scheduled CC or per UE via a DCI, medium access control (MAC)-control element (CE), or radio-resource control (RRC) configuration. In certain aspects, the minimum k0 threshold may be explicitly RRC-configured per BWP. For example, entries in a PDSCH-symbolAllocation table with k0 less than a threshold, or a PUSCH-symbol allocation table with k2 less than a threshold, may be implicitly invalidated considered unusable. Error cases may occur if an invalidated entry is still indicated by scheduling, or if no entries in the table are valid.

In certain aspects, DCI may indicate a value for k0 that is smaller than the minimum threshold, which would be considered invalid by the UE. How the UE handles this condition may be left up to UE implementation. For example, as the UE is not expected to handle PDSCH scheduled with k0 smaller than the threshold, it may drop (e.g., ignore) this DCI.

In certain aspects, a threshold value may be added to an indication of k0 in the scheduling DCI. For example, k0' may be calculated by the UE based on a sum of k0 and a k0 threshold indicated in the DCI. In this case, all entries in the PDSCH-symbolAllocation table may still be usable and the UE may not need to drop the DCI.

In certain aspects, a minimum of an indicated k0 and the k0 threshold may be used. For example, instead of dropping the DCI, the UE may set k0 to the threshold k0 (which serves as a minimum or "floor").

In certain aspects, the minimum threshold may be defined in specification. For example, the minimum k0 threshold may be directly defined in the specification instead of by explicit configuration. In certain aspects, the minimum threshold may be tied to connected mode discontinuous reception (C-DRX). For example, during the ON duration of the C-DRX mode, a larger minimum k0 threshold may be used and a smaller (or none) minimum k0 threshold when DRX inactivity timer is counting.

In certain aspects, the minimum k0 threshold may apply not only to PDSCH scheduling, but may be generalized to apply to other DL scheduling, including but not limited to CSI-RS transmitted on the DL after an A-CSI request is triggered by the network. Currently, CSI-RS is transmitted in the same slot as the A-CSI request DCI for non-Type-D-QCL. While the examples provided herein have described a minimum threshold for k0 and PDSCH scheduling to facilitate understanding, aspects of the present disclosure may be similarly applied to the UL counterpart of k0, the minimum k2 and PUSCH scheduling.

As contemplated above, there are various limitations for Cross-Slot Scheduling in current systems. One limitation relates to fast adaptation between cross-slot scheduling and same-slot scheduling with BWP adaptation. Because the time domain resource allocation (TDRA) tables (i.e., PDSCH-symbolAllocation and PUSCH-symbolAllocation tables) are BWP-specific, some BWPs can be configured with all entries with k0>0, whereas some (other) BWPs can be configured with entries containing k0=0. As a result, switching between BWP can achieve the result of adapting between minimum k0>0 and minimum k0=0.

One rather subtle issue is that, during a BWP switch, for the DCI that triggers the BWP switch, the TDRA table configured for the target BWP is typically used. Because a UE does not know a-priori when it would receive a BWP-switching DCI, it may be difficult to guarantee that a schedulable k0 is always greater than zero, even if a minimum k0 is configured to be greater than zero for the current BWP. The following provide various approaches to workaround this problem.

One approach is, for a BWP other than the current BWP (intended to support cross-slot scheduling), if k0=0 entry should be configured in the corresponding TDRA table, assign the entry with a higher index such that it is not addressable by the bit-width of the frequency domain RA field of the current BWP. For example, assuming a frequency domain RA (FDRA) field has bit width of 1 bit for the current BWP, for the other BWP, the table could be configured to make sure the k0=0 entry (if any) is assigned index 2 or larger.

BWP transition time defined in the standard specification may be made large enough such that the k0=0 entries in other BWPs are considered non-schedulable from the current BWP. This may address a need for the indicated k0 for cross-BWP scheduling to accommodate the BWP transition time (which is defined to be slightly more than 2 msec by RAN4 for Type 2 switching or less for Type 1).

Management of different minimum k0 values across BWP presents a challenge, for cross-BWP scheduling (which triggers BWP switch), because the target BWP TDRA table is typically used. As described above, minimum k0 is a function of all the entries in the TDRA table, but the UE does not know a-priori when and which BWP would be triggered to switch to (in case there are more than two BWPs configured). The minimum k0 that a UE has to be prepared to handle can be expressed as the following:

$$\min\left(\min\_k0(BWP0), \max\left(BWP \text{ transition time in slots}, \min_{n=1\ldots numBWP-1}(\min\_k0(BWPn))\right)\right)$$

where:
min_k0(BWPx) is the minimum k0 across all entries in the TDRA table for BWPx, where x={0, . . . , numBWP-1}; and
numBWP is the number of configured DL BWP.

Without the loss of generality, BWP0 in the equation above may be assumed to be the current BWP. The above discussion can be generalized to minimum value for k2 as well. Overall, minimum k0 and minimum k2 can be discussed more generally as a "minimum DL scheduling offset" and "minimum UL scheduling offset" to cover requirements for transmissions other than PDSCH and PUSCH (such as aperiodic CSI triggering, etc.).

For reasons discusses above, it may be important to ensure proper support for minimum scheduling offset configuration. One relatively straight-forward approach is to have an explicit configuration of the minimum DL scheduling offset. This minimum DL scheduling offset may accomplish the following:

It explicitly controls the minimum k0 that UE is expected to handle for PDSCH scheduling, even for cross-BWP scheduling (i.e. triggering BWP switch); and
It defines the minimum timing offset for aperiodic CSI-RS triggering As noted above, more generally, such configuration may define the minimum timing offset for all other DL channel/signal that is scheduled by DCI. Similarly, a minimum UL scheduling offset can be explicitly configured, serving UL scheduling usage.

The constraints described herein may require special consideration for DCI monitored in common search space (CSS). For DCI scrambled with an ID (e.g., SI/P/RA/TC-RNTI), monitored in Type 0/0A/1/2 CSS, a default or common TDRA table may be used. Also, for DCI scrambled with CS/MCS-C/C-RNTI in CSS in CORESET 0, the common TDRA table may be used. The default TDRA table may be fixed in a standard specification and may contain k0=0 entries. The common TDRA table can be configured and provided, for example, in a common configuration for PDSCH (e.g., PDSCH-ConfigCommon). As a result, an exception may be made for PDSCH scheduled under the aforementioned conditions and the minimum DL scheduling offset may not be applicable, in order to ensure proper fallback operation. The duty cycle for monitoring DCI scrambled with SI/P/RA/TC-RNTI may be configured to be very small so that majority of the time, handling k0=0 can be avoided. For DCI scrambled with C-RNTI detected in CSS (if not in CORESET 0), a UE-specific TDRA table may be used if available, so that a minimum scheduling offset may still apply.

Minimum DL/UL scheduling offsets can be attributes of BWP configurations. The minimum DL/UL scheduling offsets in use can be a set of values associated with the BWP which is currently active.

Figure 12A:
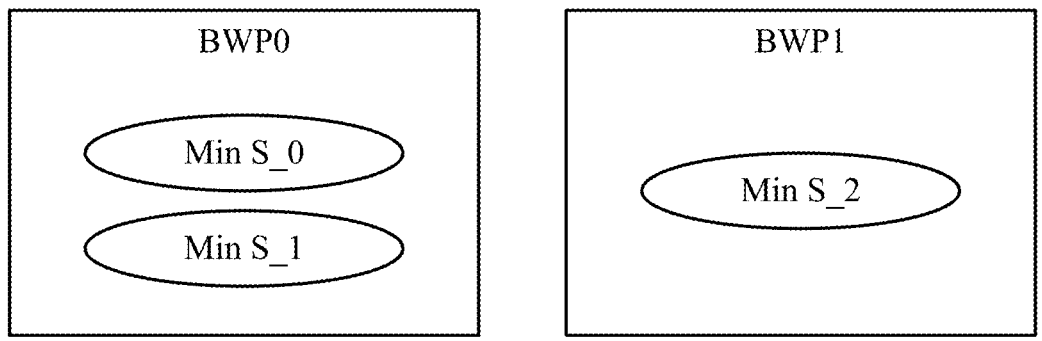
FIGS. 12A and 12B illustrates example bandwidth part scheduling parameters, in accordance with aspects of the present disclosure.
Figure 12B:
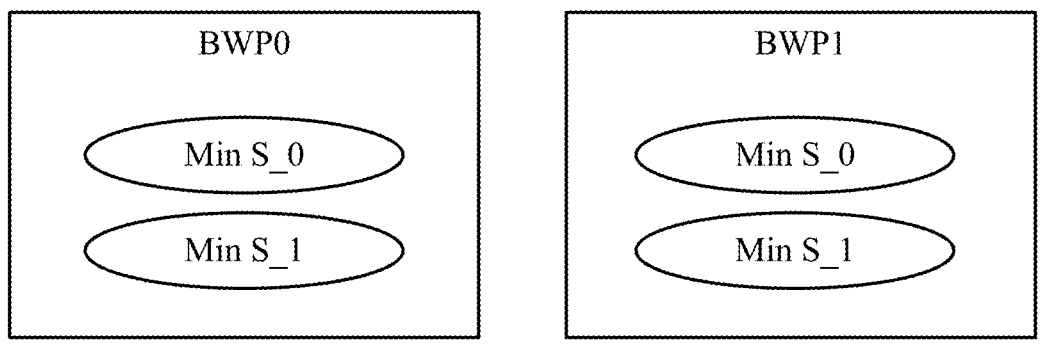

As illustrated in FIGS. 12A and 12B, in addition to such a TDRA table configuration per DL BWP, there can be one or multiple minimum DL scheduling offsets configured per DL BWP. In the example shown FIG. 12A, there are multiple minimum DL scheduling offsets for BWP0 and a different DL scheduling offset for BWP1. In the example shown in FIG. 12B, both BWP0 and BWP1 both have multiple minimum DL scheduling offsets (with the same values). The same use of multiple values can be used for minimum UL scheduling offsets and UL BWPs.

In the case multiple minimum scheduling offsets are supported for a particular BWP, as in the examples shown in FIGS. 12A and 12B, additional signaling can be used to choose which offset is to be selected.

For example, minimum scheduling offsets corresponding to a large and small delay can be configured for BWP1. In some cases, semi-static signaling (e.g. via RRC signaling) may convey the multiple values, while AC CE or DCI signaling may select which of the minimum scheduling offsets to use. For periods of very little traffic, the larger minimum scheduling offset can be selected to maximize power saving benefits. In some cases, there can be an initial minimum scheduling offset (e.g., which is designated as one of the configured minimum scheduling offsets) for the BWP.

When the BWP becomes active, the initial minimum scheduling offset is implicitly selected for use. Alternatively, the minimum scheduling offset implicitly selected for use when the BWP becomes active can also be the value that was most recently selected for use when the BWP was last active. A default value may still need to be designated for the very first time the BWP becomes active after the BWP is (re)configured. The parameter sets configured per BWP need not be limited to minimum scheduling offsets only, but could be extended to include other parameters.

When signaling (e.g. DCI) changes the minimum scheduling offset value that is currently in use to a new value, the application time of the new value may account for the time taken for the reception and processing of the signaling. For example, for DCI signaling, the current minimum scheduling offset defines the latest time that DCI processing has to finish. Therefore the application time of the new value may be such that it is not earlier than the current minimum scheduling offset from the slot the DCI indicating the change is received. Otherwise, a more stringent processing timeline may have to be imposed to DCI processing and may result in reduced power saving. In other words, for DCI indication to change the minimum scheduling offset (X), the start time of the new minimum value (X_new) may be applied in the slot which is max(X, Z) number of slots after the DCI indicating the change is received. In this case, Z is a positive integer number for the minimum number of slots for applying the change (e.g. Z=1).

Figure 13:
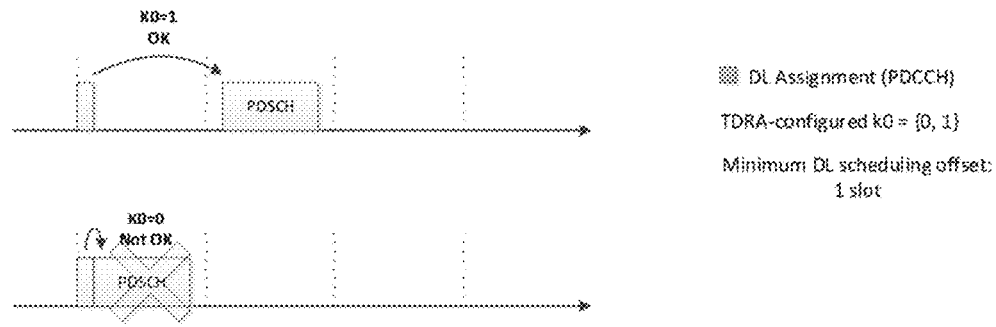
FIG. 13 illustrates example downlink communications with bandwidth parts (BWP).

FIG. 13 illustrates an example of operation with minimum DL scheduling offset for PDSCH. As illustrated, DCI with an indication of k0 which is smaller than the minimum DL scheduling offset may be considered invalid. TDRA table entries with k0 less than the minimum DL scheduling offset are essentially "dummy values." Explicitly controlling the minimum scheduling offset may allow more flexibility in configuring the TDRA table. In some cases, the table may be configured with the same content for the table for different BWPs, while still having different minimum scheduling offset across BWPs.

Figure 14:
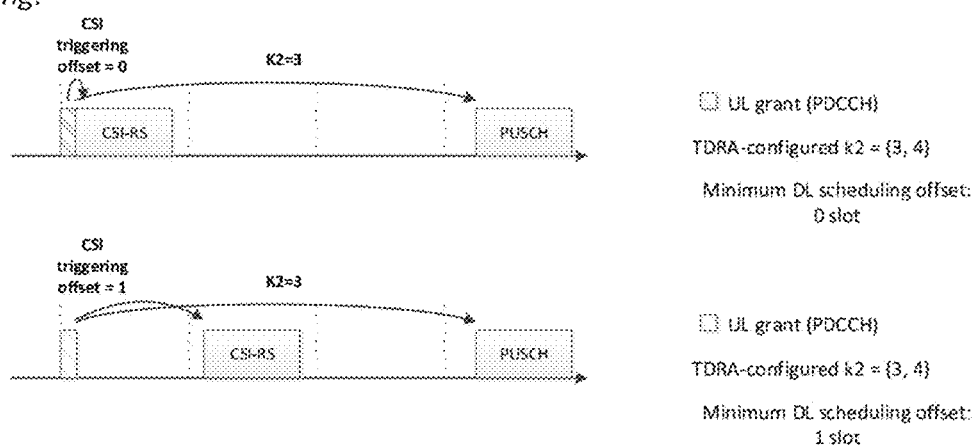
FIG. 14 illustrates example scheduling offset with aperiodic channel state information (A-CSI).

FIG. 14 illustrates an example of operation with minimum DL/UL scheduling offset for A-CSI. The minimum DL scheduling offset may also serve as at least the lower bound for the triggering offset for aperiodic CSI-RS. The timing of CSI-RS may be a function of the configured CSI triggering offset (which is fixed to zero for non-QCL-Type-D in Rel-15), and the minimum DL scheduling offset. Two examples of such functions include:

max(CSI trigger offset, minimum DL scheduling offset); or

CSI trigger offset+minimum DL scheduling offset.

Alternatively, the CSI trigger offset may be made a DCI signaled parameter and may be required to follow the minimum DL scheduling offset rule. For combined A-CSI trigger and BWP switch trigger, the network can indicate a larger CSI trigger offset to accommodate DL BWP switch latency.

Figure 15:
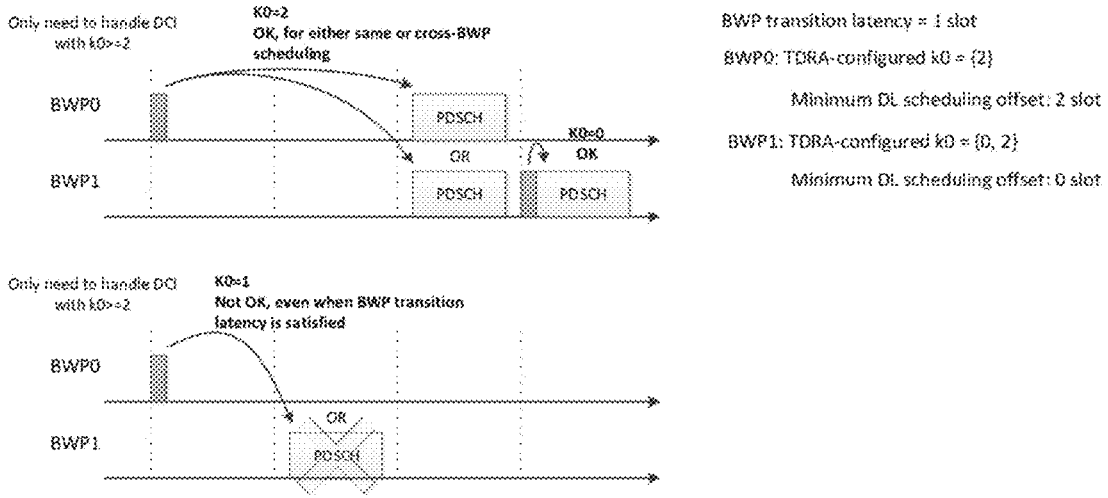
FIG. 15 illustrates example scheduling offset with multiple bandwidth parts (BWPs).

As illustrated in FIG. 15, the minimum scheduling offset may be applied with scheduling across multiple BWPs. The illustrated example assumes a BWP switching latency of 1 slot, a single TDRA configured value (2) of k0 for BWP0 and two TDRA configured values (0,2) of k0 for BWP1. As illustrated, even when the BWP switching latency is satisfied, the minimum DL scheduling offset may need to be satisfied (or a PDSCH scheduled by a DCI may be dropped as illustrated in the figure).

The techniques described herein may also be applicable to Cross-Carrier Scheduling (e.g., a DCI received in one BWP scheduling a transmission in another BWP). According to certain systems, search space configuration for cross-carrier scheduling may be based on the currently active BWP on the scheduled carrier. There may be a linkage rule for the search space defined for the scheduled carrier to that for the scheduling carrier. Similar to self-scheduling, the minimum k0 may be determined based on the TDRA tables across all schedulable BWP on the scheduled carrier, along with any additional conditions such as BWP transition latency.

For cross-carrier scheduling, there may be an even stronger motivation for introducing explicit minimum scheduling offsets. For example, if traffic on a secondary cell (Scell) is light, there could be long gaps of inactivity on the SCell. In such cases, a UE may save more power by operating in lower power mode (e.g. at reduced clock/voltage for the baseband). The UE may even choose to suspend processing related to the SCell while it is not being scheduled, for example, with reduced CSI measurement and reporting, and/or SRS transmission.

However, for such power saving to be feasible, it may be a prerequisite to guarantee a scheduling delay from the scheduling carrier (e.g., the primary cell or PCell) to the scheduled carrier (e.g. SCell), such that there can be enough time for hardware to transition to higher power mode to process the scheduled operations on the SCell. Similar to self-scheduling, this can be achieved by careful configuration of minimum k0 across the BWP of the scheduled carrier. However, there is still a potential issue with making the A-CSI triggering offset consistent with the minimum k0. Explicit minimum scheduling offsets applied to cross-carrier scheduling may help solve the issue, while simplifying the configuration and operation.

Figure 16:
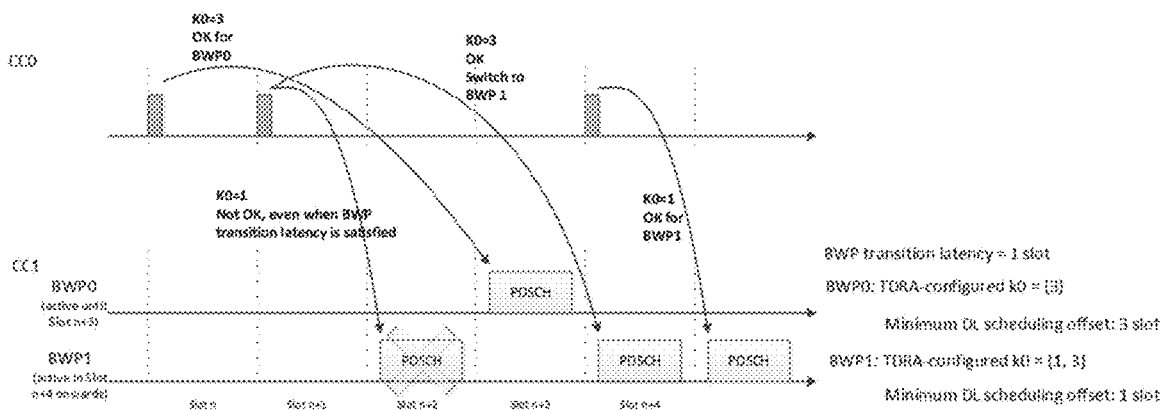
FIG. 16 illustrates example scheduling offset with cross-carrier scheduling.

FIG. 16 illustrates how the minimum scheduling offset may be applied to Cross-Carrier Scheduling operation. The illustrated example assumes a BWP switching latency of 1 slot, a single TDRA configured value (3) of k0 for BWP0 and two TDRA configured values (1,3) of k0 for BWP1. As illustrated, the minimum scheduling offset of the active BWP on the scheduled carrier guarantees certain scheduling delay. In the illustrated example, BWP0 of CC1 can be the "power saving BWP" as it is configured with a large minimum DL scheduling offset. It can be used most of the time when traffic is sparse. When there is more traffic, BWP1 of CC1 can become the active BWP and a smaller minimum DL scheduling offset can be used for lower latency.

In some cases, minimum scheduling offsets may be used as UE feedback (e.g., implicitly indicating UE capability). For cross-carrier scheduling with different numerologies, due to potential for extra buffering requirement and satisfying the causality condition for scheduling, a non-zero minimum DL scheduling offset may need to be configured, but the amount of the offset may be dependent on UE capability (e.g. the buffering capacity it is designed to support).

In such cases, it may make sense for a UE to report a desired minimum scheduling offset effectively as an indication of UE capability. Extending this further, there may be a power saving benefit for having sufficiently large minimum scheduling offset for cross-carrier scheduling (regardless of same/different numerologies). The amount of scheduling delay needed to achieve power saving may be UE-implementation dependent. The UE capability framework described herein can be generalized to any cross-carrier scheduling configuration.

In some cases, a UE-based assistance framework may be used (to report a desired minimum scheduling offset) instead of UE capability framework. In such cases, a UE may report preferred values of minimum scheduling offsets. The network may then decide, based on the UE-reported preferred values, how to configure the final minimum scheduling offsets.

The minimum UL scheduling offsets described herein could be applied to a variety of different uplink transmissions. A sounding reference signal (SRS) is one example of such a transmission. In some cases, a minimum UL scheduling offset could be applied to an aperiodic SRS (A-SRS) transmitted on the uplink after an (A-SRS) request is triggered (e.g., via DCI conveyed in a PDCCH). In such cases, an A-SRS configuration may be signaled via RRC signaling and triggered via DCI.

The time granularity of the scheduling parameter in the DCI and/or the minimum threshold may vary. For example, the granularity in either symbol resolution or slot resolution may be used. In some cases, symbol level resolution may be derived from a scheduling parameter (e.g., indicated from a TDRA table). In some cases, the granularity may be quantized to a slot resolution.

In some cases, the granularity may be based on the numerology of the transmission scheduled by the PDCCH, in case it is different from the numerology of the PDCCH. In other cases, the granularity could be based on the PDCCH. In some other cases, the granularity could be based on the numerology of the currently active BWP, or a reference numerology. As used herein, the term numerology generally refers to waveform parameters, such as cyclic prefix length and subcarrier spacing (SCS). In general, the duration of an OFDM symbol is inversely proportional to subcarrier spacing.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity, comprising:
   determining a minimum threshold for a scheduling parameter that indicates a scheduling delay between an end of a physical downlink control channel (PDCCH) transmission and a beginning of a transmission scheduled by the PDCCH; and
   configuring a user equipment (UE) with the minimum threshold, wherein one or multiple values of the minimum threshold is configured on a per bandwidth part (BWP) basis.

2. The method of claim 1, wherein:
   a value of the minimum threshold depends, at least in part, on a power savings state of the UE.

3. The method of claim 2, wherein the minimum threshold has a larger value during an ON duration of a lower power than when an inactivity timer of the lower power state is counting.

4. The method of claim 1, wherein the scheduled transmission comprises an uplink transmission.

5. The method of claim 4, wherein the uplink transmission comprises at least one sounding reference signal (SRS) transmitted on the uplink after an aperiodic SRS (A-SRS) request is triggered.

6. The method of claim 1, wherein the scheduled transmission comprises a downlink transmission.

7. The method of claim 6, wherein the downlink transmission comprises at least one channel state information reference signals (CSI-RS) transmitted on the downlink after an aperiodic CSI (A-CSI) request is triggered.

8. The method of claim 1, further comprising providing signaling indicating the minimum threshold.

9. The method of claim 8, wherein the signaling indicates a selection from a set of values for the minimum threshold value.

10. The method of claim 9, wherein:
the set of values is indicated via radio resource control (RRC) signaling; and
the method further comprises providing signaling selecting one of the set of values via at least one of: media access control (MAC) control element (CE) or DCI signaling.

11. The method of claim 9, further comprising selecting one of the values based on a traffic load.

12. The method of claim 1, wherein a value of the minimum threshold is signaled per BWP.

13. The method of claim 1, wherein determination of the minimum threshold is performed in orthogonal frequency division multiplexed (OFDM) symbol resolution or slot resolution, based on a numerology of the PDCCH or the numerology of the transmission scheduled by the PDCCH.

14. The method of claim 1, further comprising:
transmitting a physical downlink control channel (PDCCH) transmission with downlink control information (DCI) signaling the scheduling parameter indicating the scheduling delay; and
communicating the transmission scheduled by the PDCCH.

15. The method of claim 14, wherein the value of the scheduling parameter is not below the minimum threshold.

16. An apparatus for wireless communications by a network entity, comprising:
means for determining a minimum threshold for a scheduling parameter that indicates a scheduling delay between an end of a physical downlink control channel (PDCCH) transmission and a beginning of a transmission scheduled by the PDCCH; and
means for configuring a user equipment (UE) with the minimum threshold, wherein one or multiple values of the minimum threshold is configured on a per bandwidth part (BWP) basis.

17. An apparatus for wireless communications comprising:
a processor;
memory coupled with the processor; and
instructions stored in the memory and operable, when executed by the processor, to cause the apparatus to:
determine a minimum threshold for a scheduling parameter that indicates a scheduling delay between an end of a physical downlink control channel (PDCCH) transmission and a beginning of a transmission scheduled by the PDCCH; and
configure a user equipment (UE) with the minimum threshold, wherein one or multiple values of the minimum threshold is configured on a per bandwidth part (BWP) basis.

18. The apparatus of claim 17, wherein:
a value of the minimum threshold depends, at least in part, on a power savings state of the UE.

19. The apparatus of claim 18, wherein the minimum threshold has a larger value during an ON duration of a lower power than when an inactivity timer of the lower power state is counting.

20. The apparatus of claim 17, wherein the scheduled transmission comprises an uplink transmission.

21. The apparatus of claim 20, wherein the uplink transmission comprises at least one sounding reference signal (SRS) transmitted on the uplink after an aperiodic SRS (A-SRS) request is triggered.

22. The apparatus of claim 17, wherein the scheduled transmission comprises a downlink transmission.

23. The apparatus of claim 22, wherein the downlink transmission comprises at least one channel state information reference signals (CSI-RS) transmitted on the downlink after an aperiodic CSI (A-CSI) request is triggered.

24. The apparatus of claim 17, further comprising instructions operable to cause the apparatus to provide signaling indicating the minimum threshold.

25. The apparatus of claim 24, wherein the signaling indicates a selection from a set of values for the minimum threshold value.

26. The apparatus of claim 25, wherein:
the set of values is indicated via radio resource control (RRC) signaling; and
the apparatus further comprises instructions operable to cause the apparatus to provide signaling selecting one of the set of values via at least one of: media access control (MAC) control element (CE) or DCI signaling.

27. The apparatus of claim 25, further comprising instructions operable to cause the apparatus to select one of the values based on a traffic load.

28. The apparatus of claim 17, wherein a value of the minimum threshold is signaled per BWP.

29. The apparatus of claim 17, wherein determination of the minimum threshold is performed in orthogonal frequency division multiplexed (OFDM) symbol resolution or slot resolution, based on a numerology of the PDCCH or the numerology of the transmission scheduled by the PDCCH.

30. The apparatus of claim 17, further comprising instructions operable to cause the apparatus to:
transmit a physical downlink control channel (PDCCH) transmission with downlink control information (DCI) signaling the scheduling parameter indicating the scheduling delay; and
communicate the transmission scheduled by the PDCCH.

31. The apparatus of claim 30, wherein the value of the scheduling parameter is not below the minimum threshold.

32. A non-transitory computer-readable medium having instructions stored thereon which, when executed by a processor, performs an operation for wireless communications by a network entity, the operation comprising:
determining a minimum threshold for a scheduling parameter that indicates a scheduling delay between an end of a physical downlink control channel (PDCCH) transmission and a beginning of a transmission scheduled by the PDCCH; and
configuring a user equipment (UE) with the minimum threshold, wherein one or multiple values of the minimum threshold is configured on a per bandwidth part (BWP) basis.

* * * * *